(12) United States Patent
Shimizu et al.

(10) Patent No.: US 6,553,766 B2
(45) Date of Patent: Apr. 29, 2003

(54) COOLING STRUCTURE OF A COMBUSTOR TAIL TUBE

(75) Inventors: Takehiko Shimizu, Takasago (JP); Satoshi Hada, Takasago (JP); Kouichi Akagi, Takasago (JP); Katsunori Tanaka, Takasago (JP); Ryotaro Magoshi, Takasago (JP); Mitsuo Hasegawa, Takasago (JP); Shigemi Mandai, Takasago (JP); Mitsuru Kondo, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/832,937

(22) Filed: Apr. 12, 2001

(65) Prior Publication Data

US 2001/0037646 A1 Nov. 8, 2001

(30) Foreign Application Priority Data

Apr. 13, 2000 (JP) .................. 2000-111557
May 24, 2000 (JP) .................. 2000-152426
Jun. 20, 2000 (JP) .................. 2000-184225

(51) Int. Cl.$^7$ ................ F23R 3/06; F02C 7/16
(52) U.S. Cl. ................ 60/752; 60/757; 60/760
(58) Field of Search ........... 60/752, 757, 760, 60/730

(56) References Cited

U.S. PATENT DOCUMENTS 3,572,031 A * 3/1971 Szetela ................ 60/757
4,719,748 A * 1/1988 Davis, Jr. et al.
5,647,202 A * 7/1997 Althaus ................ 60/760
5,724,816 A * 3/1998 Ritter et al. ............ 60/752
5,822,853 A * 10/1998 Ritter et al. ............ 29/890.01
5,906,093 A * 5/1999 Coslow et al.
6,018,950 A * 2/2000 Moeller
6,220,036 B1 * 4/2001 Inada et al. ............ 60/760
6,282,905 B1 * 9/2001 Sato et al. .............. 60/760

FOREIGN PATENT DOCUMENTS

| EP | 0 203 431 | * 12/1986 |
| EP | 0 725 253 | * 8/1996 |
| EP | 0 815 995 | * 1/1998 |
| EP | 0 972 992 | * 1/2000 |
| JP | 410288048 A | * 10/1998 |
| JP | 2984427 | 9/1999 |
| JP | 2000-145479 | 5/2000 |

* cited by examiner

Primary Examiner—Ted Kim
(74) Attorney, Agent, or Firm—Wenderoth, Lind & Ponack, L.L.P.

(57) ABSTRACT

A cooling structure of a combustor tail tube is capable of avoiding the formation of cracks in the tail tube by lessening thermal stress and preventing thermal deformation, thus extending the service life. A multiplicity of cooling jackets (5) extend in the longitudinal direction of the tail tube of a gas turbine combustor along the entire circumference of the tail tube wall. The passage sectional area of the cooling jackets (5) is varied depending on the metal temperature of parts of the tail tube (4). For example, the passage sectional area of the cooling jackets (5) formed at the rotor side wall and the mutually opposite side walls of the adjacent tail tube is larger than the passage sectional area of the cooling jackets (5) formed at the casing side wall.

19 Claims, 8 Drawing Sheets

Fig.2(a) PRIOR ART

(ARROW VIEW ALONG LINE A-A')

Fig.2(b)

(ARROW VIEW ALONG LINE B-B')

COOLING STRUCTURE OF A COMBUSTOR TAIL TUBE

BACKGROUND OF THE INVENTION

1. Field of the Invention

The present invention relates to a cooling structure of a combustor tail tube for a gas turbine.

2. Description of the Related Art

As a gas turbine combustor, recently a steam cooling type combustor low in $NO_x$ emission, even in a gas turbine of 1500° C. class, for example, is drawing attention. By cooling the combustor wall by steam, the air hitherto used for cooling the wall can be used for combustion, and in spite of the high temperature of the gas turbine, the premixed combustion temperature can be suppressed to the level of air-cooled combustor, so that low $NO_x$ is realized.

Figure 9:
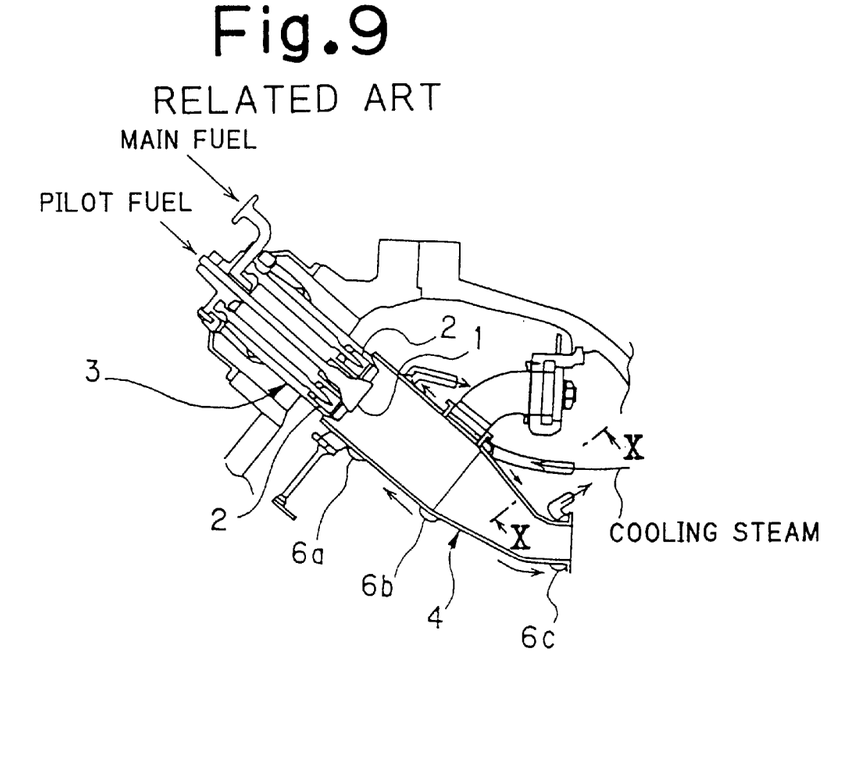
FIG. 9 is a side sectional view of a conventional gas turbine combustor.

Such steam cooling is employed in the cooling of, for example as shown in FIG. 9, a tail tube 4 of a multi-nozzle type premixed combustor 3. Premixed flame forming nozzles 2 for forming and injecting a premixed gas of main fuel and combustion air are divided and disposed in plural positions around a cone 1 for forming a diffusion flame by reaction between pilot fuel and combustion air.

According to this structure, the cooling steam is first supplied into the middle part of the tail tube 4 in the longitudinal direction (see manifold 6b) from the cooling jackets 5 (see FIG. 10) and manifold 6b formed inside the wall of the tail tube 4. It is divided in the upstream and downstream direction with regard to the gas flow indicated by arrows in the diagram to cool the wall surface, and is collected from the inlet (see manifold 6a) and outlet (see manifold 6c) of the tail tube 4. A reverse flow of cooling steam is also known, that is, the cooling steam is first supplied from the inlet (see manifold 6a) and outlet (see manifold 6c) of the tail tube 4, then flows into the middle part (see manifold 6b) to cool the wall surface, and is collected from the middle part.

Figure 10:
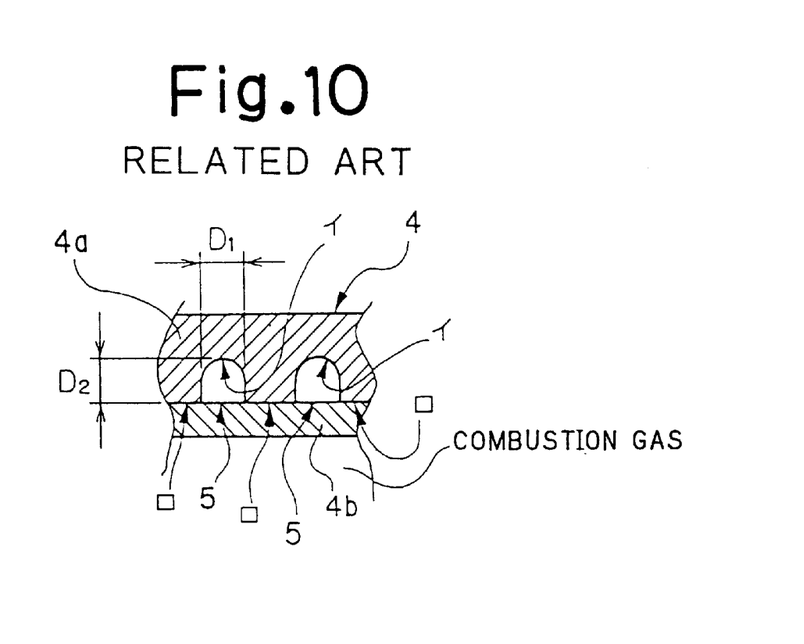
FIG. 10 is a sectional view taken along line X—X of FIG. 9.

The cooling jacket 5 is formed, as shown in FIG. 10, by processing a groove (see groove processing part "a") of width $D_1$ and depth $D_2$ in one wall 4a of the tail tube 4 of double wall structure, and brazing the groove side to other wall 4b (see brazing part "b").

In this conventional cooling structure of a combustor tail tube, however, although the temperature conditions generally differ locally, with respect to an elevated position of metal temperature at the inner side (rotor side) and lateral side (opposite sides of adjacent tail tubes) from the outer side (casing side) of the tail tube 4 formed in a rectangular shape at the outlet side, the size (passage sectional area) of the cooling jackets 5 is set uniformly on the entire circumference. The flow rate distribution of cooling steam to necessary parts is thus set regardless of the metal temperature, and cracks are likely to be formed at four corners of the outlet of the tail tube 4 due to thermal deformation caused by increases of thermal stress by uneven metal temperatures and a lack of cooling in the outlet (in particular the flange) of the tail tube 4.

The invention is devised in light of the above background, and it is hence an object thereof to present a cooling structure of combustor tail tube capable of preventing the formation of tail tube cracks by decreasing the thermal stress and preventing thermal deformation, thus extending the service life.

SUMMARY OF THE INVENTION

To solve the above problems, the invention presents a cooling structure of combustor tail tube forming a multi-plicity of cooling jackets extending in the longitudinal direction of a tail tube of a gas turbine combustor along the entire circumference of a tail tube wall. The passage sectional area of cooling jackets varies depending on the metal temperature of the tail tube parts.

Preferably, the passage sectional area of the cooling jackets formed at the rotor side wall and the mutually opposite side walls of the adjacent tail tube is formed larger than the passage sectional area of the cooling jackets formed at the casing side wall of the tail tube.

Preferably, the cooling jackets are extended from the root of the flange attached to the peripheral edge of the outlet of the tail tube in the flange height direction, and are pulled back after the cooling medium is supplied in the area.

Preferably, an annular cooling passage is formed to surround the outlet in the front portion of the flange attached to the edge of the outlet of the tail tube, and the cooling medium is directly supplied into the cooling passage without cooling the tail tube wall.

Preferably, the tail tube is formed in a double wall structure, a groove is processed in one wall, the groove side is bonded with the other wall to form a cooling jacket, and the groove side wall is disposed at the inner wall side to be exposed to combustion gas.

Preferably, the cooling medium is supplied from the combustion gas outlet of the tail tube, and the cooling medium is collected from one position at the combustion gas inlet side.

BRIEF DESCRIPTION OF THE DRAWINGS

FIGS. 1(a)–1(c) are structural diagrams of a cooling jacket showing a first embodiment of the invention, in which

FIGS. 2(a)–2(b) are structural explanatory diagrams of a tail tube outlet showing a second embodiment of the invention, in which FIG. 2(b) is a structural diagram of a tail tube outlet of the invention;

DESCRIPTION OF THE PREFERRED EMBODIMENTS

Referring now to the drawings, preferred embodiments of the cooling structure of a combustor tail tube of the invention are described in detail below.

First Embodiment

Figures 1A, 1B, 1C:
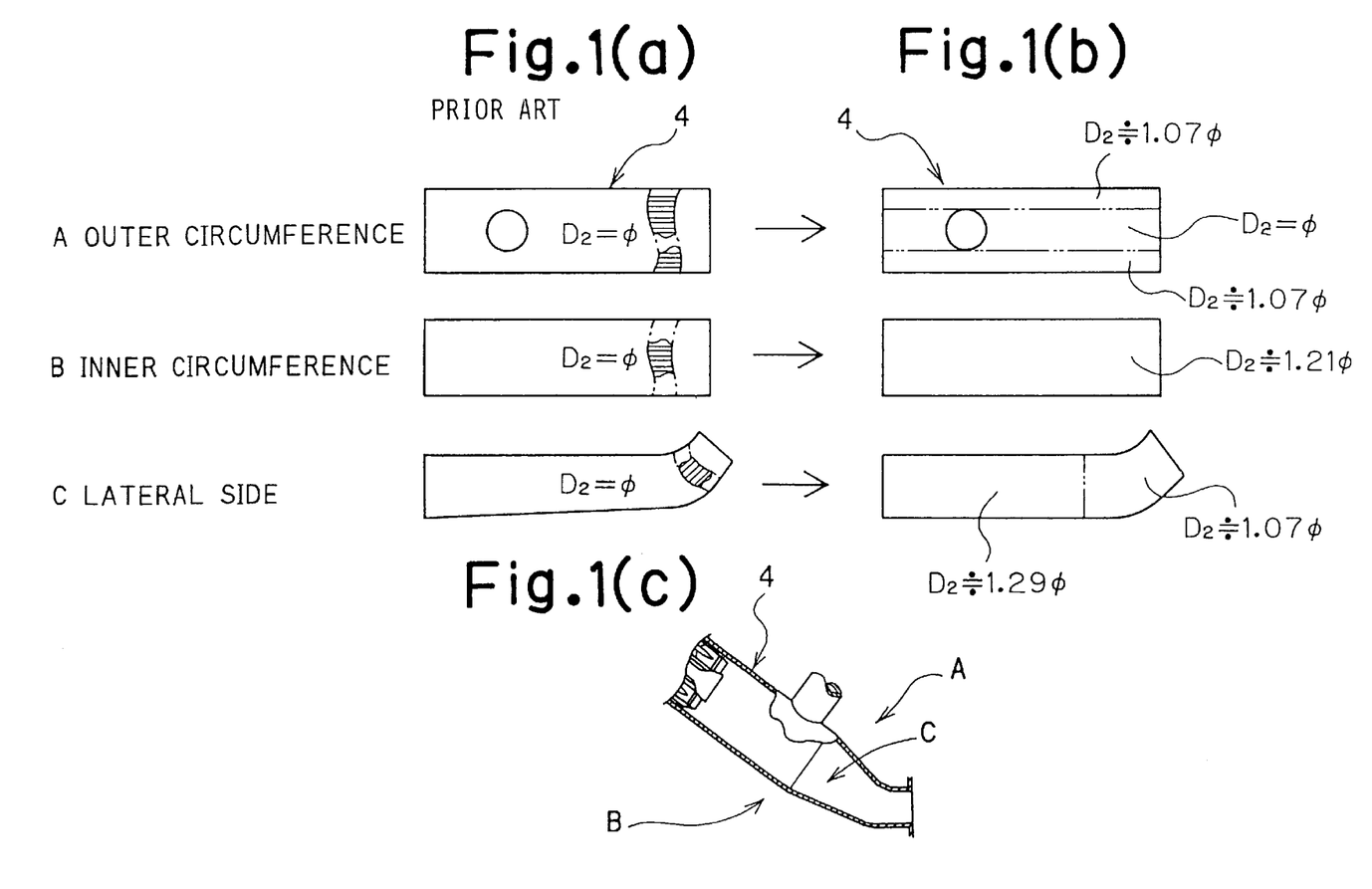
FIG. 1(a) is a diagram of the size of an existing cooling jacket.
FIG. 1(b) is a diagram of the size of a cooling jacket of the invention.
FIG. 1(c) is a partial cut-away perspective view of a tail tube.

FIGS. 1 are structural explanatory diagrams of a cooling jacket showing a first embodiment of the invention, in which FIG. 1(a) is a diagram of the size of an existing cooling jacket, FIG. 1(b) is a diagram of the size of the cooling jacket of the invention, and FIG. 1(c) is a partial cut-away perspective view of a tail tube. In FIG. 1(a), a passage of the cooling jacket is shown in a partially cut-away view.

As shown in FIGS. 1, in this embodiment, the cooling jacket (see reference numeral 5 in FIG. 10) formed inside the wall of the tail tube 4, formed in a rectangular shape, at the outlet side is expanded in passage sectional area in most parts as compared with the existing cooling jacket. Further, the passage sectional area varies, for example, in the outer circumference (casing side) A of the tail tube 4, inner circumference (rotor side) B, and lateral side (opposite sides of adjacent tail tubes) C, depending on the metal temperature of the parts of the tail tube 4.

That is, in the existing cooling jacket, as shown in FIG. 1(a), a uniform cooling jacket size of groove depth $D_2$ (see FIG. 8)=ømm, for example, is set in all parts of the outer circumference, inner circumference, and lateral sides. But in the embodiment, as shown in FIG. 1(b), the cooling jacket size is set at the groove depth $D_2$=ømm in the central part of the outer circumference and groove depth $D_2$=about 1.07 ømm at both lateral parts (corners). The cooling jacket size is set at groove depth $D_2$=about 1.21 ømm at the inner circumference and groove depth $D_2$=about 1.29 ømm at the upstream portion of the lateral side. On the other hand, the cooling jacket size is set at groove depth $D_2$=about 1.07 ømm at the downstream portion of the lateral side. The number of cooling jackets is same in both the existing structure and this embodiment of the invention.

Thus, in this embodiment of the invention, by varying the cooling jacket size of the parts so that the metal temperature may be uniform in the parts of the tail tube 4, the flow rate distribution of cooling steam as a cooling medium is optimized. Therefore thermal deformation, due to an increase of thermal stress by uneven metal temperature and lack of cooling of the outlet of the tail tube 4, can be effectively prevented, and crack formation at the outlet of the tail tube 4 can be avoided.

In the embodiment, the groove width $D_1$ may also be increased, together with the groove depth $D_2$, to change the cooling jacket size in various parts.

Second Embodiment

Figure 2A:
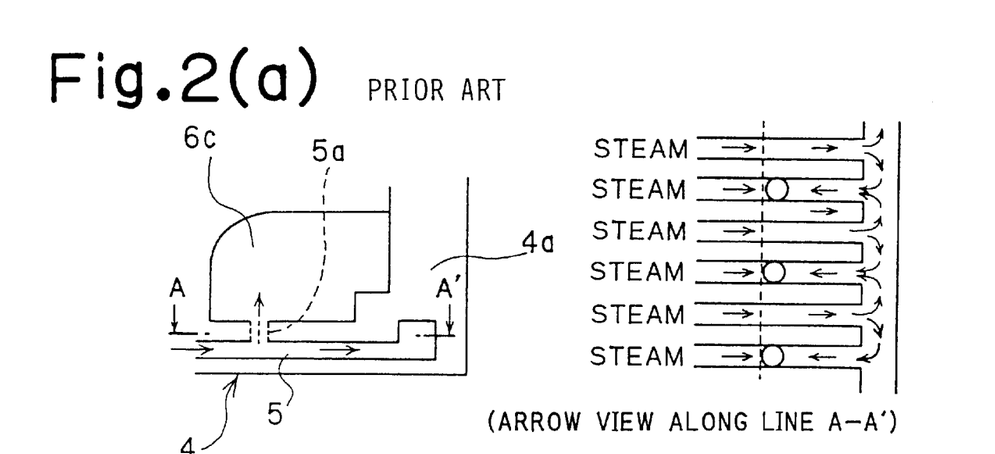
FIG. 2(a) is a structural diagram of an existing tail tube outlet.
Figure 2B:
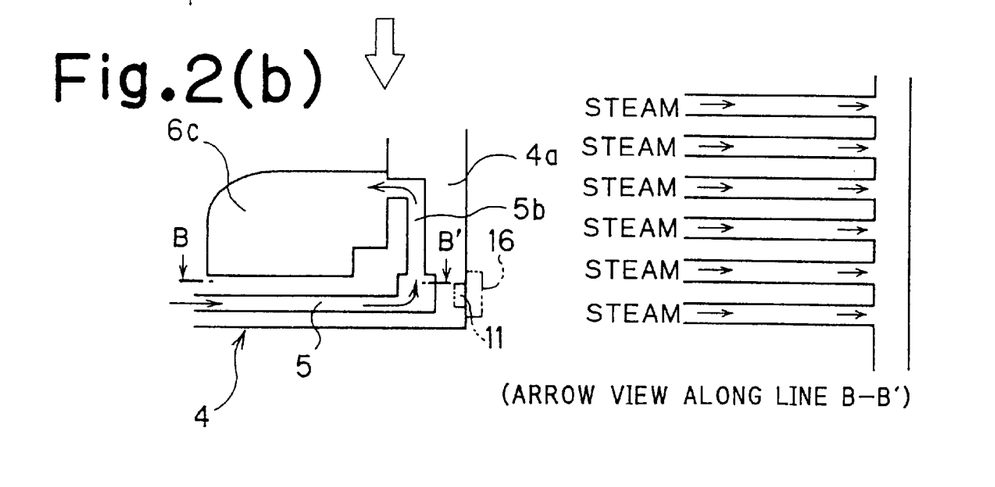

FIGS. 2 are structural explanatory diagrams of a tail tube outlet showing a second embodiment of the invention, in which FIG. 2(a) is a structural diagram of an existing tail tube outlet, and FIG. 2(b) is a structural explanatory diagram of a tail tube outlet of the invention. The entire structure of the tail tube is shown in FIG. 9, and thus detailed description is omitted herein.

As shown in FIG. 2, in this embodiment, the destination of the cooling jacket 5 (see FIG. 10) for supplying cooling steam to the flange 4a projecting outward to the outlet peripheral edge (opening peripheral edge) of the tail tube 4 is changed, so that the flange 4a is cooled by steam in particular.

That is, in the existing cooling jacket 5, as shown in FIG. 2(a), the cooling steam sent to the root of the flange 4a flows into the adjacent cooling jacket 5 at the root, slightly returns into the upstream side, and flows into the manifold 6c through the pass hole 5a (formed at every other cooling jacket 5). In the embodiment of the present invention as shown in FIG. 2(b), the cooling steam sent into the root of the flange 4a flows through the passage 5b extending in the height direction of the flange 4a, and flows into the manifold 6c.

Therefore, the passage 5b, unlike the pass hole 5a, is formed in every cooling jacket 5.

Thus, in the embodiment, the cooling steam is supplied into the entire flange 4a at the outlet of the tail tube 4, and cooling of the flange 4a is reinforced. Thermal deformation due to temperature differences can thus be prevented, and crack formation at the outlet of the tail tube 4 can be avoided.

Third Embodiment

Figure 3:
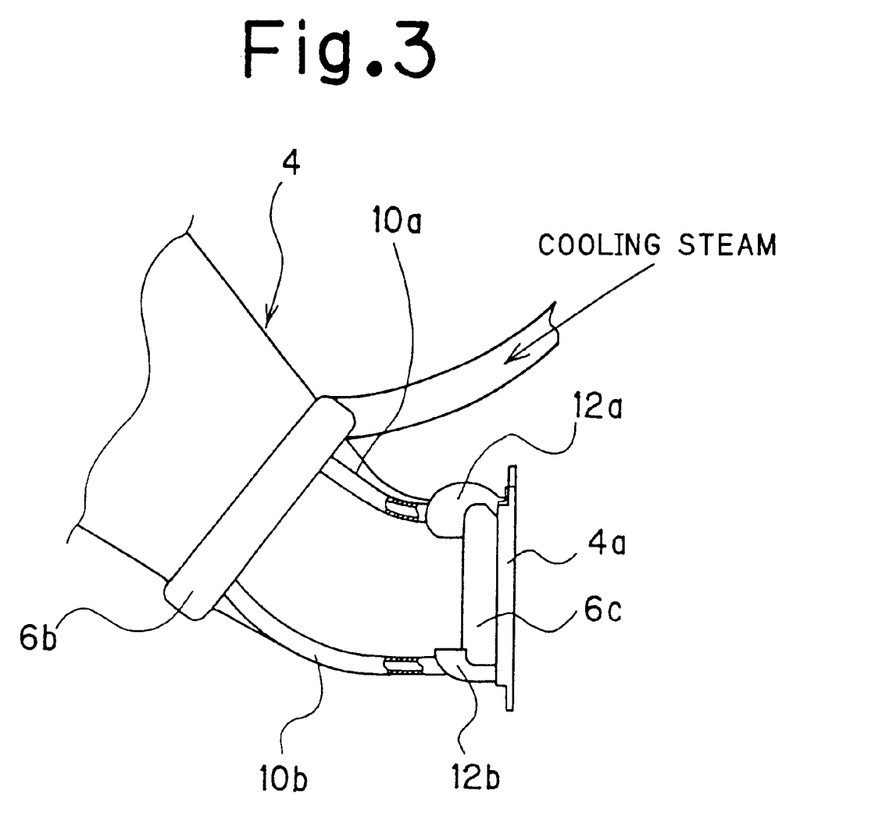
FIG. 3 is an essential side view of a tail tube showing a third embodiment of the invention.
Figure 4:
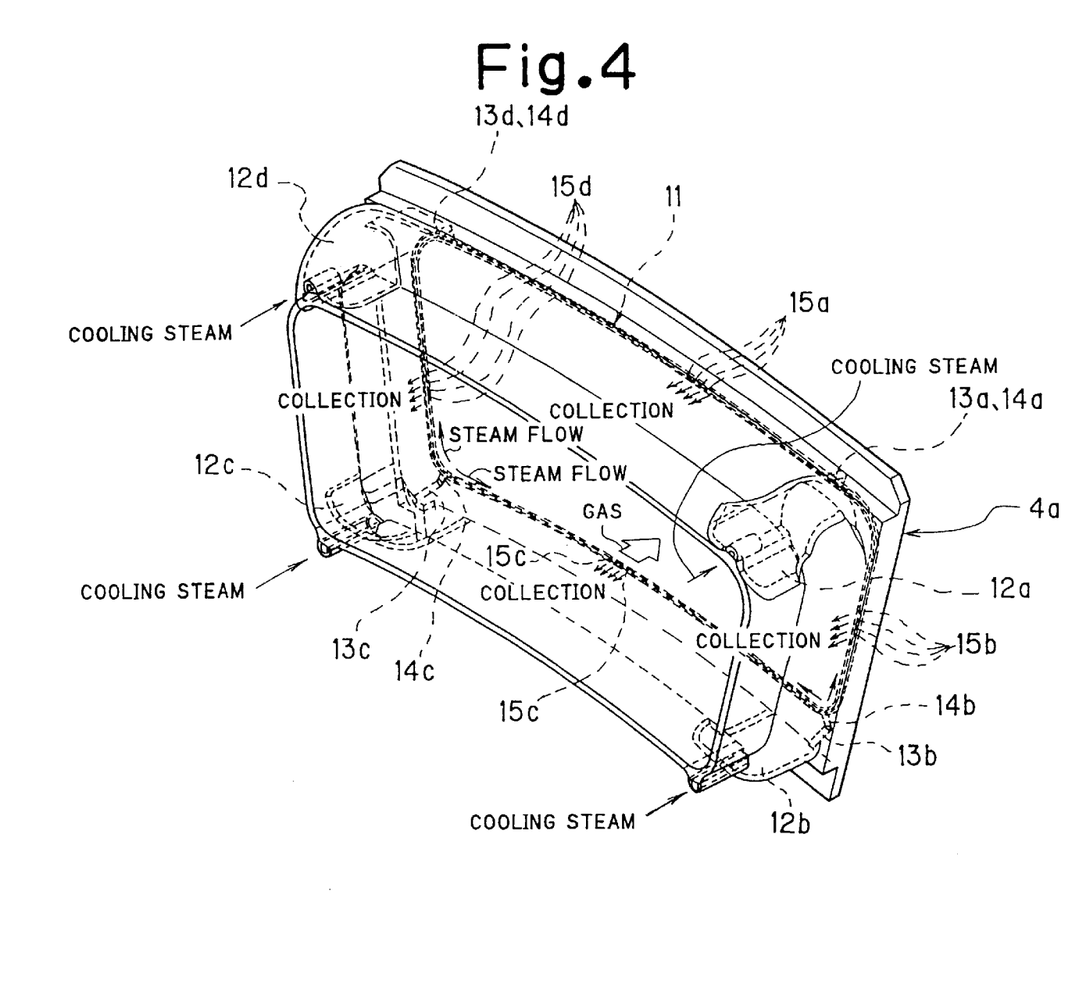
FIG. 4 is a back perspective view of the tail tube outlet.
Figure 5:
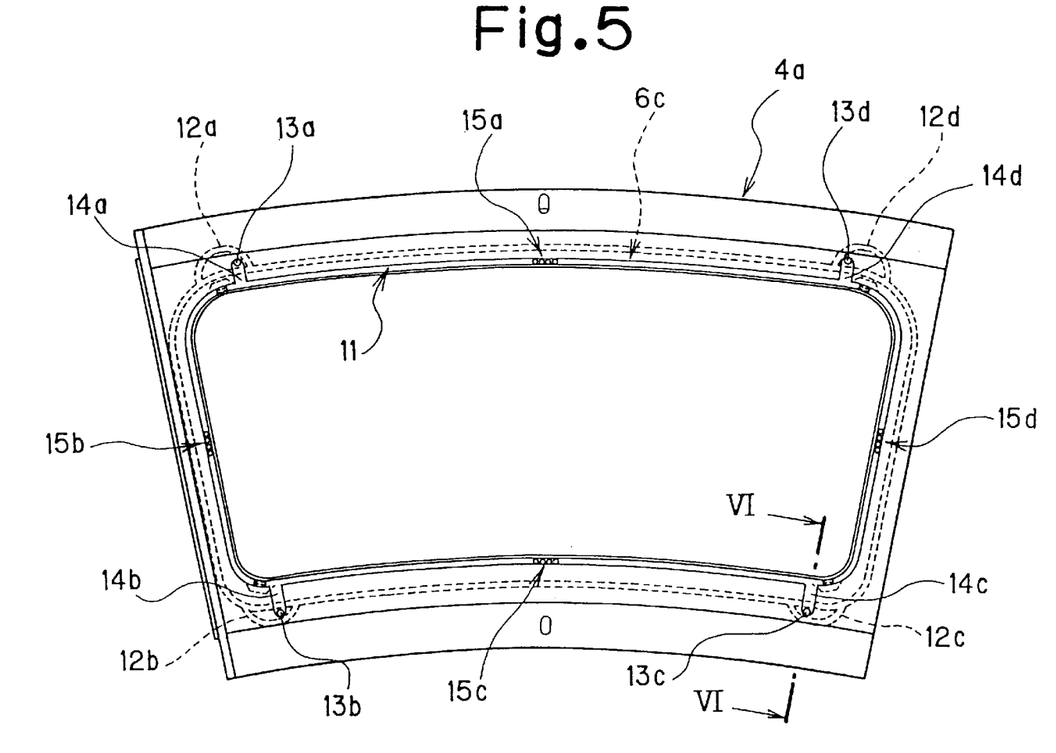
FIG. 5 is a front view of the tail tube outlet.
Figure 6:
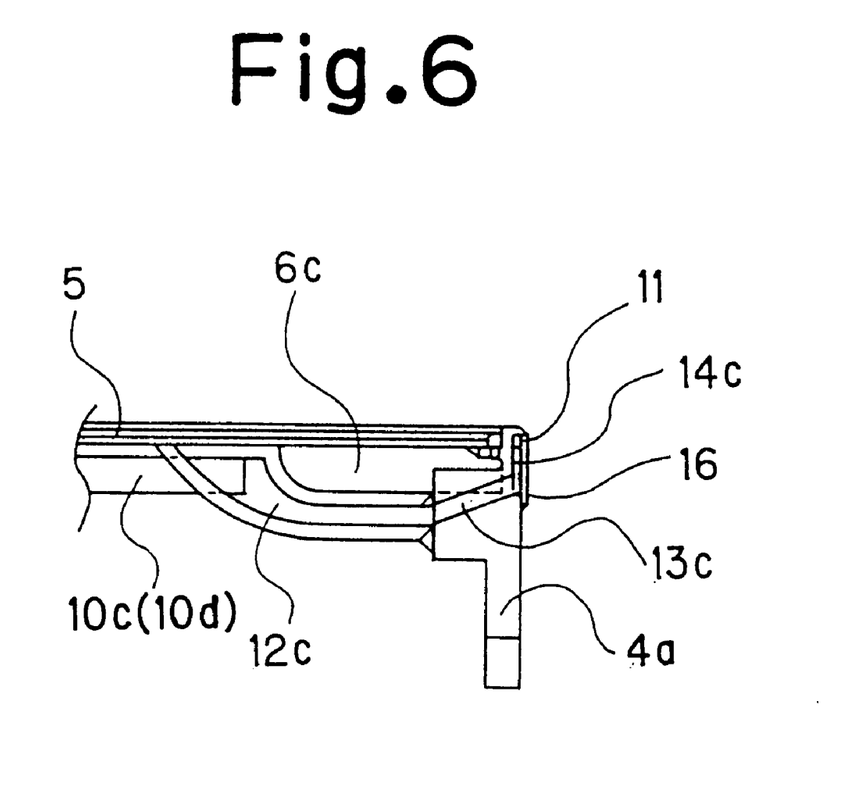
FIG. 6 is a sectional view taken along line VI—VI of FIG. 5.

FIG. 3 is a side view of a tail tube showing a third embodiment of the invention, FIG. 4 is a back perspective view of the tail tube outlet, FIG. 5 is a front view of the tail tube outlet, and FIG. 6 is a sectional view taken along line VI—VI of FIG. 5.

As shown in FIG. 3 to FIG. 6, in this embodiment, aside from the cooling jackets (see reference numeral 5 in FIG. 10) formed inside the wall of the tail tube 4 formed in a rectangular shape at the outlet side, bypass steam jackets 10a to 10d are formed. The cooling steam not cooling the wall of the tail tube 4 is supplied through the bypass steam jackets 10a to 10d into an annular cooling passage 11 formed at the front side of the flange 4a at the outlet of the tail tube 4, so that the flange 4a is cooled by steam in particular.

That is, the bypass steam jackets 10a to 10d are branched into four lines in the peripheral direction along the outer circumference of the tail tube 4 from the manifold 6b, and communicate with steam sumps 12a to 12d formed at four corners at the outlet of the tail tube 4. The steam sumps 12a to 12d communicate with the cooling passage 11 through pass holes 13a to 13d and groove passages 14a to 14d formed at four corners of the rectangular flange 4a. From the cooling passage 11, the cooling steam is guided into the manifold 6c through tiny hole groups 15a to 15d formed at four peripheral positions, is mixed with the cooling steam from the cooling jackets 5 and collected. Reference numeral 16 in the drawing is a cover plate for closing the cooling passage 11 and groove passages 14a to 14d after processing of the grooves.

In the embodiment, therefore, the flange 4a at the outlet of the tail tube 4 is cooled entirely by the cooling steam at low temperature supplied into the annular cooling passage 11 without heat exchange from the manifold 6b by way of the bypass steam jackets 10a to 10d, steam sumps 12a to 12d, pass holes 13a to 13d, and groove passages 14a to 14d. Sufficient cooling effect is obtained, thermal deformation due to temperature differences is prevented, and formation of cracks at the outlet of the tail tube 4 is avoided.

Fourth Embodiment

Figure 7:
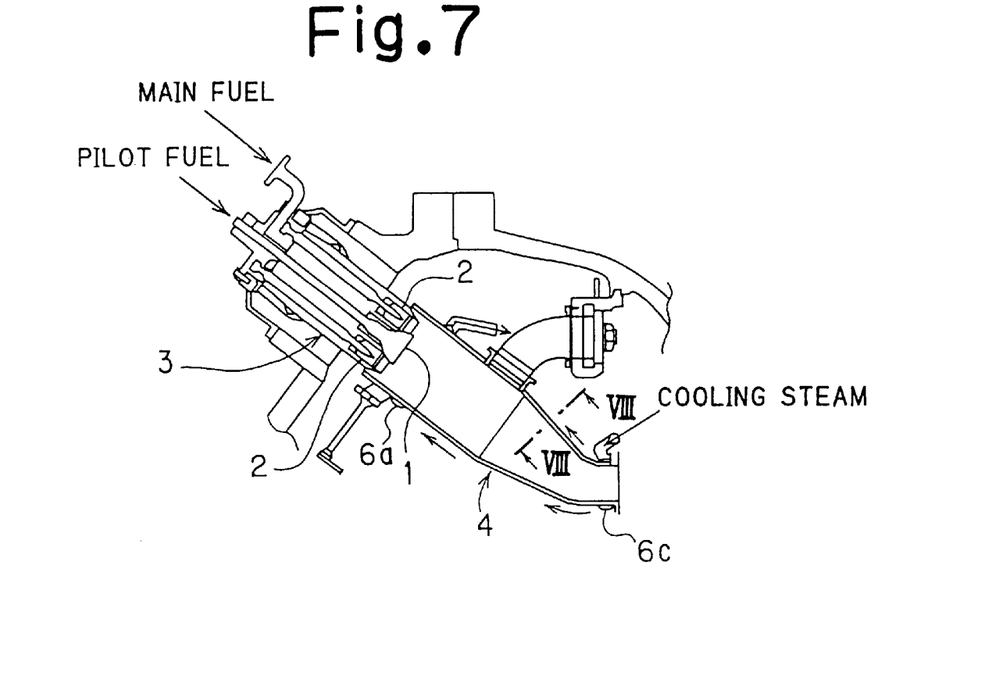
FIG. 7 is a side sectional view of a gas turbine combustor showing a fourth embodiment of the invention.
Figure 8:
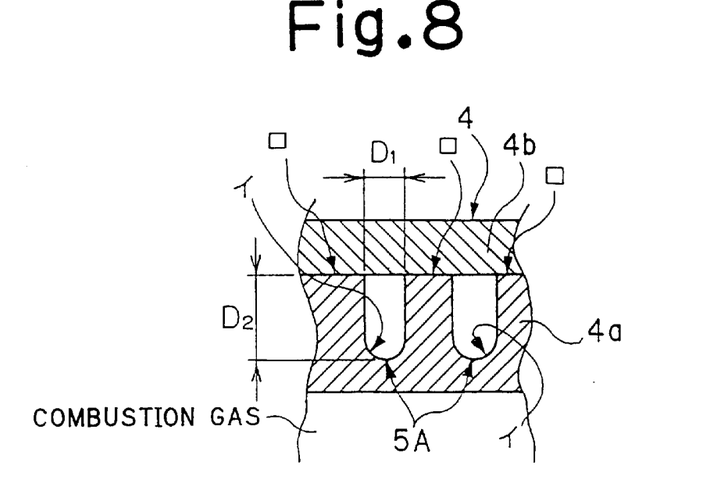
FIG. 8 is a sectional view taken along line VIII—VIII of FIG. 7.

FIG. 7 is a side sectional view of a gas turbine combustor showing a fourth embodiment of the invention, and FIG. 8 is a sectional view taken along line VIII—VIII of FIG. 7. In these diagrams, the same reference numerals are given to the parts and members that are the same as in FIG. 9 and FIG. 10, and detailed description is omitted.

As shown in FIG. 7, the invention is applied to steam cooling of a tail tube 4 of a multi-nozzle type premixed combustor 3 having premixed flame forming nozzles 2 for forming and injecting a premixed gas of main fuel and combustion air. The nozzles 2 are divided and disposed in plural positions around a cone 1 for forming a diffusion flame by reaction between pilot fuel and combustion air.

In this embodiment, the cooling steam is first supplied into the outlet (see manifold 6c) of the tail tube 4, to the cooling jackets 5A (see FIG. 8) and the manifold 6a. The steam flows upstream of the gas flow as indicated by the arrow to cool the wall surface, and is collected from one position at the inlet (see manifold 6a) of the tail tube 4.

The cooling jacket 5A is formed, as shown in FIG. 8, by processing a groove such that $D_1 < D_2$ in one wall 4a of the tail tube 4 of double wall structure, and brazing the groove side to the other wall 4b. The groove side wall 4a is disposed at the inner wall side to be exposed to the combustion gas.

Further in the embodiment, the other wall 4b at the outer wall side is formed slightly thicker than in the prior art in consideration of strength in the bending process. The wall 4a is also considerably thicker than in the prior art in order to prevent the lowering of strength in the brazing part by equalizing the pitch of the cooling jackets 5A, and to increase the passage sectional area by increasing the groove depth $D_2$.

Thus, in this embodiment, since the groove side wall 4a is disposed at the inner wall side exposed to the combustion gas, the brazing part of the cooling jacket 5A can be set apart from the combustion gas as far as possible, so that temperature elevation due to combustion gas can be prevented.

A peeling phenomenon of the brazing part due to elevated thermal stress is thereby avoided, and the service life of the combustor wall can be extended. In addition, by the long groove of the cooling jacket 5A, a flexible wall structure is realized, the thermal stress can be greatly lowered, the heating surface area is increased at the same time, and the amount of steam (or air may be used in the invention) as the cooling medium can be decreased, so that the performance of the plant may be enhanced.

In the embodiment, by the cooling jackets 5A and manifolds 6a, 6c, steam cooling is executed in one pass from the outlet to the inlet of the tail tube 4, so that the outlet of the tail tube can be cooled by the steam (or air), before temperature elevation by heat exchange.

As a result, the metal temperature is lowered, a low cycle fatigue life is extended, and the formation of cracks at the four corners of the outlet of the tail tube 4 due to elevation of thermal stress as in the prior art can be avoided. Further, by increasing the groove depth $D_2$ and increasing the passage sectional area, lowering of the strength of the brazing part can be prevented while the same steam flow rate is maintained. In addition by one-pass steam cooling, the number of jackets and manifolds can be decreased, and the structure may be simplified.

The invention is not limited to these illustrated embodiments alone, it must be noted that the invention may be changed or modified within the scope not departing from the true spirit thereof by, for example, using air as cooling medium, or executing the first to fourth embodiments simultaneously. Still more, the cooling jacket structure as shown in FIG. 8 may be applied to the steam cooling of a two-position collection system as shown in FIG. 9.

Thus, as explained specifically in relation to the embodiments, in the cooling structure of a combustor tail tube forming a multiplicity of cooling jackets extending in the longitudinal direction of a tail tube of a gas turbine combustor along the entire circumference of the tail tube wall, the passage sectional area of the cooling jackets is varied depending on the metal temperature of the tail tube parts. therefore the flow rate distribution of the cooling medium is optimized, thermal deformation due to an increase of thermal stress by an uneven metal temperature and lack of cooling at the tail tube outlet can be effectively prevented, and crack formation at the outlet of the tail tube can be avoided.

What is claimed is:

1. A cooling structure of a combustor tail tube for a gas turbine, the combustor tail tube extending in a longitudinal direction and having a circumferential wall comprising a rotor side wall, mutually opposite side walls and a casing side wall which together extend circumferentially about the tail tube, said cooling structure comprising a plurality of cooling jackets extending in the longitudinal direction of the combustor tail tube at each of said rotor side wall, said mutually opposite side walls and said casing side wall, said plurality of cooling jackets having cooling passages extending in the longitudinal direction of said tail tube at each said side wall, and said cooling passages having a sectional area such that the sectional area of said cooling passages at said rotor side wall and said mutually opposite side walls is larger than the sectional area of said cooling passages at said casing side wall in order to prevent thermal deformation due to temperature differences.

2. The cooling structure of claim 1, wherein the combustor tail tube has a flange attached to a peripheral edge of an outlet thereof, the flange having a root and extending in a flange height direction, and said cooling structure further comprises a manifold connected with said cooling jackets and a passage extending in the flange, in the flange height direction, said passage being connected with each of said cooling passages of said plurality of cooling jackets and with said manifold.

3. The cooling structure of claim 1, wherein the combustor tail tube has a flange attached to a peripheral edge of an outlet thereof, and said cooling structure further comprises an annular cooling passage surrounding the peripheral edge and in front of the flange and a bypass cooling jacket which directly supplies cooling medium into said annular cooling passage without cooling of said circumferential wall.

4. The cooling structure of claim 3, wherein said bypass cooling jacket branches into four lines in a peripheral direction along the peripheral edge of the outlet of the combustor tail tube at four corners thereof so that cooling medium is guided to a manifold of said plurality of cooling jackets through said four lines.

5. The cooling structure of claim 2, wherein said cooling structure further comprises an annular cooling passage surrounding the peripheral edge and in front of the flange and a bypass cooling jacket which directly supplies cooling medium into said annular cooling passage without cooling of said circumferential wall.

6. The cooling structure of claim 5, wherein said bypass cooling jacket branches into four lines in a peripheral direction along the peripheral edge of the outlet of the combustor tail tube at four corners thereof so that cooling medium is guided to a manifold of said plurality of cooling jackets through said four lines.

7. The cooling structure of claim 1, wherein said plurality of cooling jackets are formed in a double wall structure including grooves in one wall of said double wall structure, said grooves having a depth greater than a width thereof, said one wall being bonded to the other wall of said double wall structure on a side of said one wall in which said grooves are formed so as to form said cooling passages, and said one wall being disposed on an inner side so as to be exposed to combustion gas.

8. The cooling structure of claim 1, wherein the combustor tail tube has a combustion gas outlet end and a combustion gas inlet end, and wherein a cooling medium supply is connected with said cooling passages at the inlet end of the combustor tail tube so that the cooling medium is collected at the outlet end of the combustor tail tube.

9. A cooling structure of a combustor tail tube for a gas turbine, comprising:

a circumferential wall of the combustor tail tube, said circumferential wall comprising a rotor side wall to be directed toward a rotor of the gas turbine, mutually opposite side walls, and a casing side wall to be directed toward a casing of the gas turbine;

said rotor side wall, said opposite side walls and said casing side wall comprising respective cooling jackets extending in a longitudinal direction of said combustor tail tube;

cooling passages extending in the longitudinal direction of said tail tube in each of said cooling jackets such that each sectional area of said cooling passages of said cooling jackets of said rotor side wall and said opposite side walls is larger than the sectional area of said cooling passages of said casing side wall in order to prevent thermal deformation due to temperature differences.

10. The cooling structure of claim 9, wherein the sectional area of said cooling passages of said casing side wall is smaller at a central part of said casing side wall than at an outer part of said casing side wall.

11. The cooling structure of claim 10, wherein the sectional area of said cooling passages of said opposite side walls at an upstream part thereof is greater than that of a downstream part thereof and greater than that of said rotor side wall.

12. The cooling structure of claim 9, wherein the sectional area of said cooling passages of said opposite side walls at an upstream part thereof is greater than that of a downstream part thereof and greater than that of said rotor side wall.

13. The cooling structure of claim 9, and further comprising a flange attached to a peripheral edge of an outlet of said tail tube and extending in a flange height direction, a manifold connected with said cooling passages of said cooling jackets, and a passage extending in the flange, in the flange height direction, said passage being connected with each of said cooling passages of said plurality of cooling jackets and with said manifold.

14. The cooling structure of claim 9, wherein said combustor tail tube has a flange attached to a peripheral edge of an outlet thereof, and said cooling structure further comprises an annular cooling passage surrounding said peripheral edge and in front of said flange and a bypass cooling jacket which directly supplies cooling medium into said annular cooling passage without cooling of said circumferential wall.

15. The cooling structure of claim 14, wherein said bypass cooling jacket branches into four lines in a peripheral direction along said peripheral edge of said outlet of said combustor tail tube at four corners thereof so that cooling medium is guided to a manifold of said plurality of cooling jackets through said four lines.

16. The cooling structure of claim 13, wherein said cooling structure further comprises an annular cooling passage surrounding said peripheral edge and in front of said flange and a bypass cooling jacket which directly supplies cooling medium into said annular cooling passage without cooling of said circumferential wall.

17. The cooling structure of claim 16, wherein said bypass cooling jacket branches into four lines in a peripheral direction along said peripheral edge of said outlet of said combustor tail tube at four corners thereof so that cooling medium is guided to a manifold of said plurality of cooling jackets through said four lines.

18. The cooling structure of claim 9, wherein said plurality of cooling jackets are formed in a double wall structure including grooves in one wall of said double wall structure, said grooves having a depth greater than a width thereof, said one wall being bonded to the other wall of said double wall structure on a side of said one wall in which said grooves are formed so as to form said cooling passages, and said one wall being disposed on an inner side so as to be exposed to combustion gas.

19. The cooling structure of claim 9, wherein said combustor tail tube has a combustion gas outlet end and a combustion gas inlet end, and wherein a cooling medium supply is connected with said cooling passages at said inlet end of said combustor tail tube so that the cooling medium is collected at said outlet end of the combustor tail tube.

* * * * *